United States Patent [19]
Furuya et al.

[11] Patent Number: 5,293,390
[45] Date of Patent: Mar. 8, 1994

[54] DISCHARGE-PUMPED GAS LASER WITH INDEPENDENT PREIONIZING CIRCUIT

[75] Inventors: Nobuaki Furuya, Kawasaki; Takuhiro Ono, Zama; Naoya Horiuchi; Keiichiro Yamanaka, both of Kawasaki; Takeo Miyata, Zama; Kenichi Takahata, Kawasaki, all of Japan

[73] Assignee: Matsushita Electric Industrial Co., Ltd., Osaka, Japan

[21] Appl. No.: 873,854

[22] Filed: Apr. 27, 1992

[30] Foreign Application Priority Data

Apr. 25, 1991 [JP] Japan .................................. 3-95816

[51] Int. Cl.$^5$ .............................................. H01S 3/00
[52] U.S. Cl. ......................................... 372/38; 372/86
[58] Field of Search ................................... 372/86, 38

[56] References Cited

U.S. PATENT DOCUMENTS

| | | | |
|---|---|---|---|
| 4,630,277 | 12/1986 | Cirkel et al. ........................... | 372/38 |
| 4,802,185 | 1/1989 | Kyusho ................................. | 372/86 |
| 4,837,773 | 6/1989 | Wakata et al. ......................... | 372/86 |
| 5,048,045 | 9/1991 | Noda et al. ............................ | 372/38 |
| 5,090,021 | 2/1992 | Nakatani et al. ....................... | 372/86 |
| 5,097,472 | 3/1992 | Chenausky ............................ | 372/86 |

FOREIGN PATENT DOCUMENTS

| | | |
|---|---|---|
| 0446072 | 9/1991 | European Pat. Off. . |
| 3644004 | 6/1988 | Fed. Rep. of Germany . |
| 3722724 | 1/1989 | Fed. Rep. of Germany . |
| 62-249493 | 10/1987 | Japan . |
| 63-13887 | 1/1988 | Japan . |
| 63-110780 | 5/1988 | Japan . |

OTHER PUBLICATIONS

A. J. Andrews et al, "A KrF Fast Discharge Laser in Mixtures Containing NF3, N2F4 or SF6" Optics Communications, vol. 20, No. 2, Feb. 1977.

Primary Examiner—Léon Scott, Jr.
Attorney, Agent, or Firm—Lowe, Price, LeBlanc & Becker

[57] ABSTRACT

A discharge-pumped gas laser, typically a discharge-pumped excimer laser, includes a main discharge circuit for producing an electric discharge in a laser gas to excite the laser gas for laser emission. The main discharge circuit comprises a first electric circuit having a thyratron, a charging circuit including a charging capacitor for storing an electric energy to operate the thyratron, and a discharging circuit including a pair of main discharge electrodes and a peaking capacitor for storing an electric energy to cause a main discharge in the laser gas between the main discharge electrodes. The laser gas is preionized by preionizers having a plurality of preionizing electrodes which produce an electric discharge to preionize the laser gas. The preionizing electrodes are connected in a second circuit which has a plurality of distributing capacitors for storing an electric energy to enable the preionizing electrodes to preionize the laser gas and supply substantially uniform electric currents to the preionizing electrodes. The distributing capacitors have substantially the same capacitances. The first and second electric circuits are substantially independent of each other.

14 Claims, 3 Drawing Sheets

DISCHARGE-PUMPED GAS LASER WITH INDEPENDENT PREIONIZING CIRCUIT

BACKGROUND OF THE INVENTION

1. Field of the Invention

The present invention relates to a discharge-pumped gas laser with preionizers, and more particularly to a discharge-pumped gas laser such as a discharge-pumped excimer laser which has a preionizing circuit substantially independent of a main discharge circuit.

2. Description of the Prior Art

Some discharge-pumped gas lasers, e.g., discharge-pumped rare-gas-halide excimer lasers, include preionizers for preionizing the laser gas to stabilize a discharge between main discharge electrodes. Particularly, preionization of the laser gas for a stable discharge is indispensable for excimer lasers. Laser gas preionization is discussed in the literature *Development of Excimer Lasers and their Application Technologies and Examples*, written by Shuntaro Watanabe and published by Applied Technology Publishing, pages 15 through 30, for example.

Conventional discharge-pumped gas lasers with preionizers have a preionizing circuit included in a main discharge circuit so that the preionizer electrodes are directly and simultaneously driven by the main discharge circuit. When a peaking capacitor of the main discharge circuit is charged, the current also flows through the preionizer electrodes, and when a main discharge is produced between main discharge electrodes the discharging current also flows through the preionizer electrodes. Therefore, an unduly large current, larger than necessary to preionize the laser gas between the main discharge electrodes flows through the preionizer electrodes, producing a spark discharge that is more intensive than necessary. The preionizer electrodes thus cause an unwanted energy loss, resulting in a reduction in laser emission efficiency. The preionizer electrodes are also liable to get worn rapidly and become unstable in operation after long usage. The preionizer electrodes produce a relatively large amount of minute particles, which are deposited on optical windows, thus lowering the intensity of laser emission.

Since the preionizer electrodes are included in the main discharge circuit, the main discharge circuit is relatively large in size, and hence cannot produce a main discharge at high speed. With the slow main discharge, the main discharge uniformity and the laser emission efficiency are low.

SUMMARY OF THE INVENTION

It is an object of the present invention to provide a discharge-pumped gas laser having preionizers for preionizing a laser gas to initiate a stabilized main discharge between main discharge electrodes, with a spark discharge of sufficiently low intensity to reduce the wear of spark gaps for the prevention of an unwanted energy loss.

Another object of the present invention is to provide a discharge-pumped gas laser having a main discharge circuit which is relatively small in size for an increased main discharge speed.

According to the present invention, there is provided a discharge-pumped gas laser comprising main discharge means for producing an electric discharge in a laser gas in a main discharge region to excite the laser gas for laser emission, and preionizing means for preionizing the laser gas substantially in the main discharge region. The main discharge means comprises a first electric circuit having a switching element for starting an electric discharge, a charging circuit including a charging capacitor for storing an electric energy to operate the switching element, and a discharging circuit including a pair of main discharge electrodes between which the main discharge region is defined and a peaking capacitor for storing an electric energy to cause a main discharge in the laser gas in the main discharge region. The preionizing means comprises a second electric circuit having a plurality of preionizing electrodes for producing an electric discharge to preionize the laser gas and a plurality of distributing capacitors for storing an electric energy to enable the preionizing electrodes to preionize the laser gas and supplying substantially uniform electric currents to the preionizing electrodes, the distributing capacitors having substantially the same capacitances. The first and second electric circuits are substantially independent of each other.

The second electric circuit is connected to the thyratron. The distributing capacitors have a total capacitance smaller than the capacitance of the charging capacitor, whereby the second electric circuit operates faster than the charging circuit, and also the second electric circuit stores a smaller electric energy than the charging circuit.

The second electric circuit further includes a plurality of charging coils connected to the distributing capacitors, respectively.

The charging circuit may further include a second charging capacitor connected to the charging capacitor across the switching element, whereby electric energies stored in the connected charging capacitors can add to each other.

The above and other objects, features, and advantages of the present invention will become apparent from the following description when taken in conjunction with the accompanying drawings which illustrate preferred embodiments of the present invention by way of example.

DETAILED DESCRIPTION OF THE PREFERRED EMBODIMENTS

Figure 1:
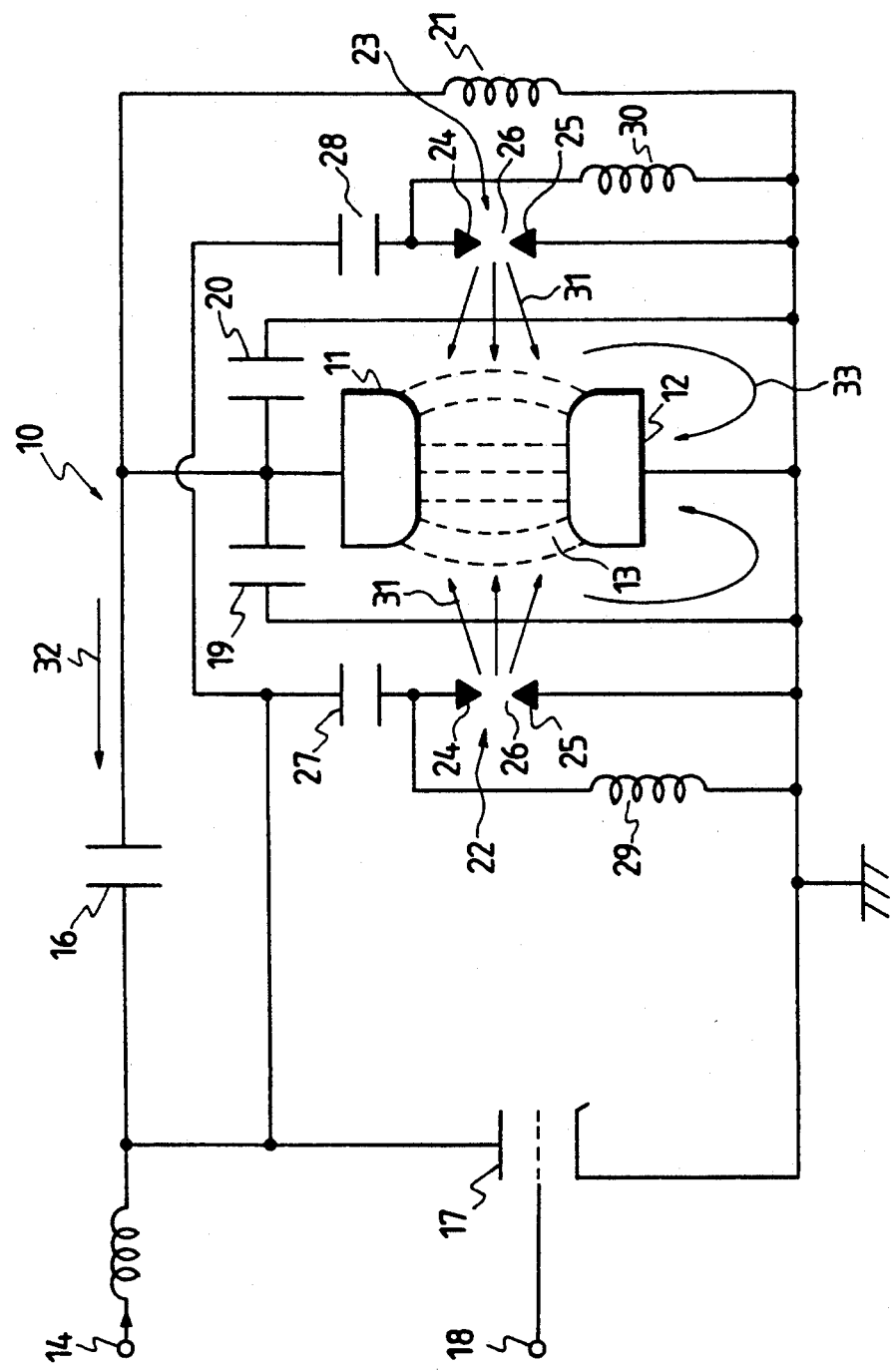
FIG. 1 is a circuit diagram of a discharge-pumped gas laser according to a first embodiment of the present invention.

Like or corresponding parts are denoted by like or corresponding reference numerals throughout views.

FIG. 1 shows the circuit arrangement of a discharge-pumped gas laser according to a first embodiment of the present invention.

As shown in FIG. 1, the discharge-pumped gas laser, generally denoted by the reference numeral 10, is typically in the form of a discharge-pumped rare-gas-halide excimer laser. The discharge-pumped gas laser 10 has a pair of main discharge electrodes 11, 12 housed in an elongate pressure container (not shown). The pressure container is filled with a laser gas such as a mixture of a rare gas and a fluorine gas of a given composition ratio, for example, under a predetermined pressure. The main discharge electrodes 11, 12 confront each other and extend longitudinally in the pressure container, i.e., in a direction normal to the sheet of FIG. 1. When a high voltage is applied between the main discharge electrodes 11, 12 they produce an electric discharge in a space therebetween which is referred to as a main discharge region 13.

The electric circuit of the discharge-pumped gas laser 10 has a terminal 14 for receiving high-voltage electric energy from a high-voltage power supply (not shown). The terminal 14 is connected to one terminal of a charging capacitor 16 whose other terminal is connected to the main discharge electrode 11. The other main discharge electrode 12 is grounded and also connected through a thyratron 17 as a switching element to the terminal 14. The thyratron 17 has a control grid to which a trigger signal can be applied from a terminal 18. The thyratron 17 may be replaced with a semiconductor switching device insofar as it can operate at high speed, has a high dielectric strength, and can handle a large current.

A pair of peaking capacitors 19, 20 is connected across the main discharge electrodes 11, 12 between the other terminal of the charging capacitor 16 and ground. A charging coil 21 is also connected across the main discharge electrodes 11, 12 between the other terminal of the charging capacitor 16 and ground.

The main discharge electrodes 11, 12 and the peaking capacitors 19, 20 jointly serve as a main discharge circuit for producing a main discharge in the main discharge region 13. The charging capacitor 16 and the charging coil 21 jointly serve as a charging circuit for storing electric energy to enable the main discharge circuit to produce a main discharge in the main discharge region 13.

The electric circuit of the discharge-pumped gas laser 10 also has a pair of preionizers 22, 23 disposed one on each side of the main discharge electrodes 11, 12. Each of the preionizers 22, 23 comprises an array of spaced electrode pairs each composed of two electrode pins 24, 25 defining a gap 26 therebetween, the electrode pairs being spaced along the main discharge electrodes 11, 12. The electrode pins 24 of the preionizers 21, 22 are connected to respective distributing capacitors 27, 28 that are connected to the terminal 14, and are also connected to respective charging coils 29, 30 that are connected to ground. The electrode pins 25 of the preionizers 22, 23 are grounded. The distributing capacitors 27, 28 serve to determine the distribution of currents to the gaps 26 between the electrode pins 24, 25. Therefore, the distributing capacitors 27, 28 should be of identical capacitance to uniformize the currents supplied to the gaps 26 for achieving a uniform main discharge in the main discharge region 13.

The preionizers 22, 23, the distributing capacitors 27, 28 connected in series to the preionizers 22, 23, and the charging coils 29, 30 connected parallel to the preionizers 22, 23 jointly serve as a preionizing circuit for preionizing the laser gas in the main discharge region 13. The preionizing circuit is essentially independent of the main discharge circuit which is composed of the main discharge electrodes 11 and the peaking capacitors 19, 20 and the charging circuit which is composed of the charging capacitor 16 and the charging coil 21.

When a high voltage from the high-voltage power supply is applied through the terminal 14, the charging capacitor 16 is charged with the supplied electric energy through the charging coil 21, and the distributing capacitors 27, 28 are also charged with the supplied electric energy through the charging coils 29, 30.

Then, when a trigger signal is applied from the terminal 18 to the control grid of the thyratron 17, the thyratron 17 is rendered conductive, allowing the electric energy stored in the distributing capacitors 27, 28 to be discharged through the gaps 26 of the preionizers 22, 23, causing a spark discharge therein. The stored electric energy is not drained through the charging coils 29, 30 as their inductance is high. The spark discharge in the gaps 26 generate an ultraviolet radiation 31 which is applied as a preionizing energy to the main discharge region 13 to uniformly ionize the laser gas in the main discharge region 13 between the main discharge electrodes 11, 12. The ultraviolet radiation thus applied preionizes the laser gas, producing electrons that are effective to give rise to a uniform glow discharge in the main discharge region 13.

The conduction of the thyratron 17 also permits the electric energy stored in the charging capacitor 16 to flow as a transient current 32 that charges the peaking capacitors 19, 20. When the peaking capacitors 19, 20 are sufficiently charged, they apply a high voltage between the main discharge electrodes 11, 12. As the voltage applied between the main discharge electrodes 11, 12 reaches a sufficiently high self-discharge voltage, a glow discharge that has been induced by the preionizing energy is rapidly initiated, causing a pulsed main discharge current 33 to flow and produce a main discharge in the main discharge region 13 between the main discharge electrodes 11, 12. The laser gas is now strongly pumped by the main discharge for laser emission which may be amplified by a suitable optical resonant system including mirrors and emitted longitudinally from the pressure container.

The preionizers 22, 23 actually have a total of 20 to 50 electrode pairs, and hence there are actually 20 to 50 distributing capacitors 27, 28 that are connected parallel to each other and also in series to the electrode pairs of the preionizers 22, 23. The total capacitance of the distributing capacitors 27, 28 is considerably smaller than, normally 1/10 of, the capacitance of the charging capacitor 16 or the peaking capacitors 19, 20, and hence the electric energy stored in all the distributing capacitors 27, 28 is much smaller than the electric energy stored in the charging capacitor 16 or the peaking capacitors 19, 20. In contrast, the capacitance of peaking capacitors 19, 20 is equivalent to the capacitance of the charging capacitor 16. Therefore, the intensity of the spark discharge produced across the gaps 26 of the preionizers 22, 23 is considerably smaller than, normally 1/10 of, the intensity of the spark discharge produced by the preionizers of conventional discharge-pumped gas lasers. As a result, the wear of the electrode pins 24, 25, which are typically made of nickel or the like, of the preionizers 22, 23 is much smaller than, normally 1/10 of, the wear of the electrode pins of the preionizers of conventional discharge-pumped gas lasers. Minute metal particles produced when the electrode pins 24, 25 are worn by the spark discharge are also much fewer, and any fogging of the windows of the optical resonant system of the discharge-pumped gas laser is greatly reduced.

Since the preionizers 22, 23 are not included in the main discharge circuit that is composed of the main discharge electrodes 11, 12 and the peaking capacitors 19, 20, the main discharge circuit may be small in size, and hence can effect a main discharge at high speed for higher main discharge uniformity and laser emission efficiency.

Figure 2:
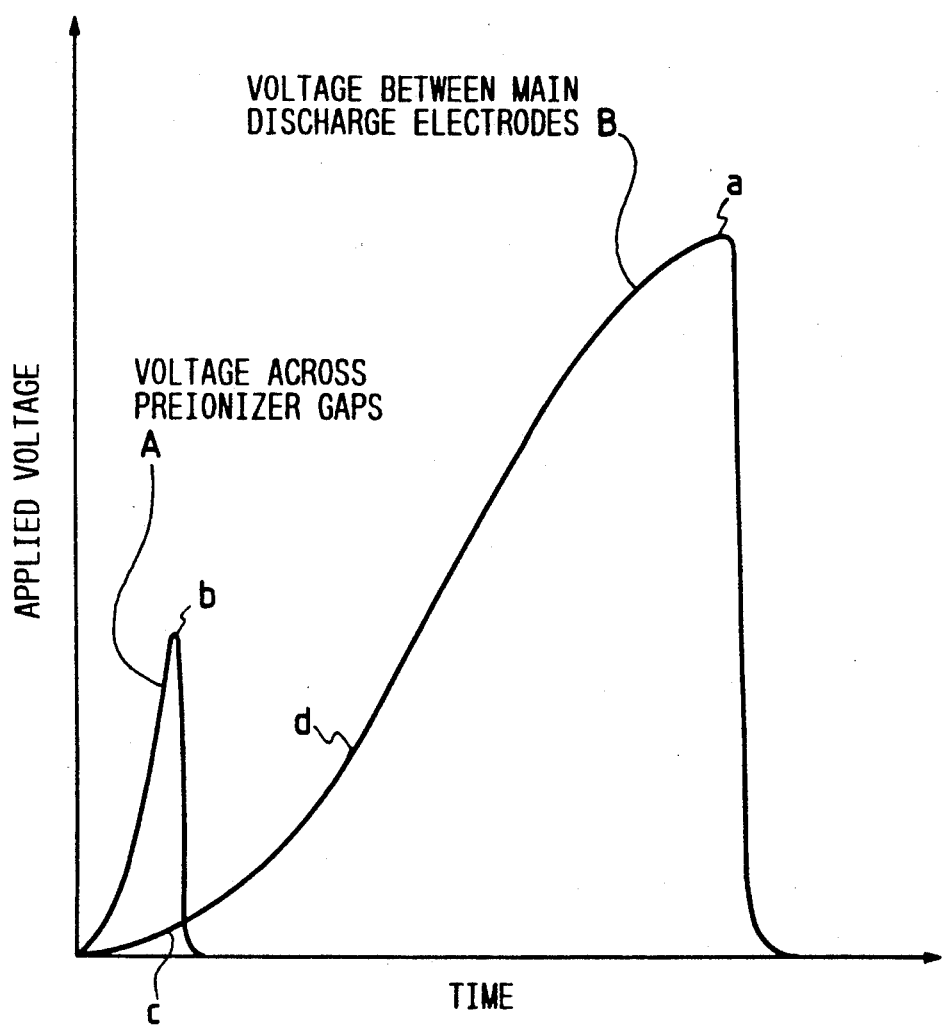
FIG. 2 is a graph showing how the voltages between preionizer electrodes and main electrodes of the discharge-pumped gas laser vary with time.

FIG. 2 shows the voltages applied across the gaps 26 of the preionizers 22, 23 and between the main discharge electrodes 11, 12 as the voltages vary with time after the thyratron 17 is rendered conductive. The voltage across the gaps 26 of the preionizers 22, 23 is indicated by a curve A, and the voltage between the main discharge electrodes 11, 12 is indicated by a curve B.

Generally, the higher the resonant frequency of a circuit, the faster the circuit operates. The resonant frequency is proportional to the reciprocal of the square root of the product of the capacitance and inductance (primarily wiring inductance) of the circuit. The preionizing circuit, which is composed of the preionizers 22, 23, the distributing capacitors 27, 28, the thyratron 17, and the charging coils 29, 30, and the charging circuit, which is composed of the charging capacitor 16 and the charging coil 21, have substantially the same inductance. However, the capacitance of the preionizing circuit is much smaller than that of the charging circuit because the total capacitance of the distributing capacitors 27, 28 is much smaller than the capacitance of the charging capacitor 16 or the peaking capacitors 19, 20, as described above. Therefore, the preionizing circuit operates much faster than the charging circuit.

As shown in FIG. 2, after the thyratron 17 is rendered conductive, the voltage between the main discharge electrodes 11, 12 increases along the curve B. When the voltage between the main discharge electrodes 11, 12 reaches a sufficient self-discharge voltage at a point a, a main discharge is initiated between the main discharge electrodes 11, 12, and the voltage therebetween sharply drops. Since the preionizing circuit operates much faster than the charging circuit, the voltage across the preionizer gaps 26 reaches a spark voltage much earlier than the self-discharge voltage, initiating a spark discharge at a point b. At this time, the voltage between the main discharge electrodes 11, 12 is much lower than the voltage across the preionizer gaps 26, as indicated by a point c.

In the conventional discharge-pumped gas lasers, since the preionizers are included in the charging circuit, the preionizers start producing a spark discharge typically at a point d in FIG. 2, depending on the voltage between the main discharge electrodes. At the point d, the voltage between the main discharge electrodes is considerably high.

If the voltage between the main discharge electrodes 11, 12 were high when a spark discharge is started by the preionizers 22, 23, the main discharge in the main discharge electrodes 11, 12 would not be highly uniform for the reasons described below.

Since the preionizers 22, 23 have as many as 20 to 50 gaps 26, spark discharges tend to be started across the gaps 26 at different voltages, and hence at different times for generating an ultraviolet radiation as a preionizing energy. The generated ultraviolet radiation preionizes the laser gas in the main discharge region 13, producing electrons. When the voltage between the main discharge electrodes 11, 12 is increased, the electrons in the main discharge region 13 are amplified due to an electron avalanche caused by the increased voltage until finally a main discharge is initiated in the main discharge region 13.

It is assumed that spark discharges begin across the gaps 26 when the voltage between the main discharge electrodes 11, 12 is relatively high, as with the conventional discharge-pumped gas lasers. Since the preionizing energy is generated at different times by the gaps 26, the electrons are produced at different times in the preionized laser gas. The electrons produced at different times are immediately amplified due to an electron avalanche caused by the high voltage between the main discharge electrodes 11, 12. The electron number density is not spatially uniform and varies from gap to gap. Such different electron number densities are responsible for reducing the spatial uniformity of the main discharge which is subsequently initiated in the main discharge region 13.

Conversely, in the circuit arrangement of the present invention, spark discharges begin across the gaps 26 before the voltage between the main discharge electrodes 11, 12 is high, as shown in FIG. 2. Therefore, even though the electrons are produced at different times by the ultraviolet radiation from the gaps 26, since the electrons are not immediately amplified by an electron avalanche when the spark discharges are initiated, the electron number density is spatially uniformized before the voltage between the main discharge electrodes 11, 12 reaches a self-discharge voltage. Consequently, the main discharge that is subsequently initiated between the main discharge electrodes 11, 12 is uniform for highly efficient and stable laser emission.

Since no unduly high voltage is applied to the preionizers 22, 23 and hence no unduly large current flows through the gaps 26, the electrode pins 24, 25 of the preionizers 22, 23 are less liable to wear rapidly, and the gaps 26 are more resistant to dimensional changes.

The charging coils 29, 30 may be dispensed with. Without the charging coils 29, 30, however, since spark discharges would also be caused across the gaps 26 when the distributing capacitors 27, 28 are charged, the electrode pins 24, 25 of the preionizers 22, 23 would be worn at a rate twice the rate with the charging coils 29, 30 employed.

Figure 3:
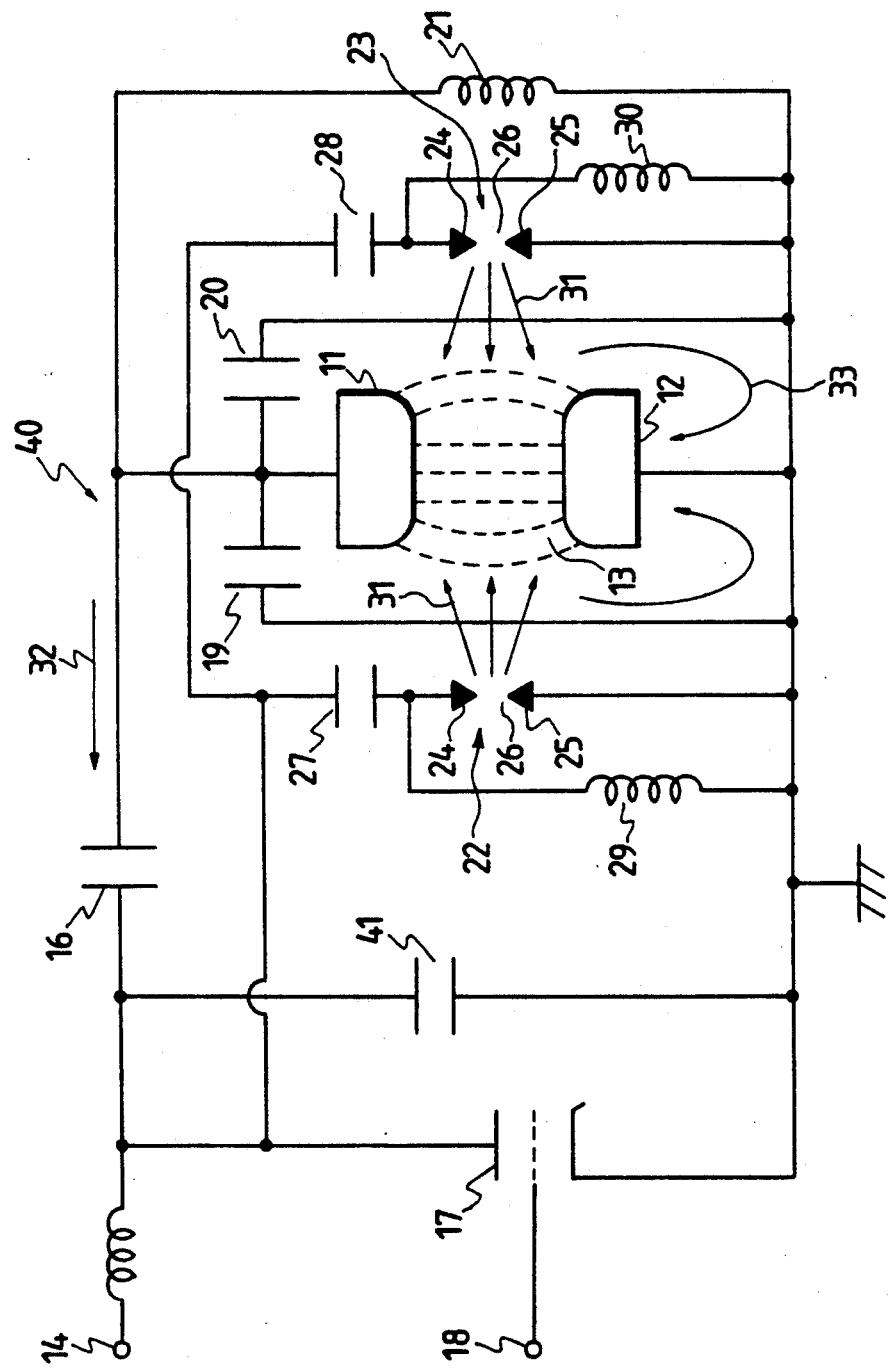
FIG. 3 is a circuit diagram of a discharge-pumped gas laser according to a second embodiment of the present invention.

FIG. 3 shows a discharge-pumped gas laser according to a second embodiment of the present invention. The discharge-pumped gas laser, generally designated by the reference numeral 40 in FIG. 3, is different from the discharge-pumped gas laser 10 shown in FIG. 1 only in that another charging capacitor 41 is connected across the thyratron 17, i.e., between the terminal 14 and ground. The charging capacitor 41 is typically of the same capacitance as that of the charging capacitor 16. The charging capacitors 16, 41, the thyratron 17, and the charging coil 21 jointly serve as a charging circuit for storing electric energy to enable the main discharge circuit to produce a main discharge in the main discharge region 13.

The charging capacitor 41 and the thyratron 17 jointly constitute a closed-loop resonant circuit of inductive and capacitive elements. Upon elapse of a time corresponding to half of the resonance period of the resonant circuit after the thyratron 17 has been rendered conductive, the electric energy stored in the charging capacitor 41 has its polarity inverted (see the literature *Development of Excimer Lasers and their Application Technologies and Examples* for details).

The voltage across the charging capacitor 16 and the voltage across the charging capacitor 41 are then added into a doubled voltage, which is applied to the peaking capacitors 19, 20. The electric energy stored in the charging capacitors 16, 41 flows as a transient current 32 that charges the peaking capacitors 19, 20. Since the charging capacitors 16, 41 apply a voltage, which is twice their charged voltage, to the peaking capacitors 19, 20, the thyratron 17 may have a lower dielectric strength than it does in the circuit shown in FIG. 1.

While the present invention has been described with respect to a discharge-pumped rare-gas-halide excimer laser, the principles of the present invention are also applicable to a pulsed discharge-pumped gas laser such as a TEA (transverse excitation-atmospheric pressure) carbon dioxide laser.

Although certain preferred embodiments of the present invention have been shown and described in detail, it should be understood that various changes and modifications may be made therein without departing from the scope of the appended claims.

What is claimed is:

1. A discharge-pumped gas laser comprising:
   main discharge means for producing a main electric discharge in a laser gas in a main discharge region to excite the laser gas for laser emission,
   said main discharge means comprising a switching element for starting the main electric discharge, a charging circuit including a charging capacitor for storing an electric energy to operate said switching element, a peaking capacitor for storing the electric energy stored in said charging capacitor of said charging circuit by action of said switching element, and a discharging circuit including a pair of main discharge electrodes between which said main discharge region is defined for discharging the electric energy stored in said peaking capacitor to cause the main electric discharge in the laser gas in said main discharge region; and
   preionizing means for preionizing the laser gas in said main discharge region prior to the main electric discharge caused by the electric energy which is discharged by said main discharge electrodes of said discharging circuit,
   said preionizing means being arranged independent of said main discharge means, and
   said preionizing means comprising a plurality of preionizing electrodes for producing a preionizing discharge to preionize the laser gas, and a plurality of distributing capacitors for respectively storing a preionizing energy to enable said preionizing electrodes to preionize the laser gas, said distributing capacitors having approximately equal capacitances to supply uniform electric currents to said preionizing electrodes, and the whole sum of the equal capacitances of said distributing capacitors being smaller than a capacitance of said charging capacitor of said charging circuit.

2. A discharge-pumped gas laser according to claim 1, wherein said preionizing means is operated by said switching element.

3. A discharge-pumped gas laser according to claim 1, wherein said preionizing means produce said preionizing discharge in said preionizing electrodes faster than production of the main electric discharge in said main discharge means.

4. A discharge-pumped gas laser according to claim 1, wherein a sum of the preionizing energies sorted in said distributing capacitors is smaller than the electric energy stored in said charging capacitor of said charging circuit.

5. A discharge-pumped gas laser according to claim 1, wherein said preionizing means further includes a plurality of preionizing charging coils in one-to-one correspondence to said distributing capacitors to store the preionizing energies in said distributing capacitors without supplying any electric currents to said preionizing electrodes.

6. A discharge-pumped gas laser according to claim 1, wherein said charging circuit further includes a second charging capacitor connected to said charging capacitor across said switching element, whereby electric energies stored in the connected charging capacitors can add to each other.

7. A discharge-pumped gas laser according to claim 6, wherein said preionizing means is operated responsively to said switching element.

8. A discharge-pumped gas laser according to claim 6, wherein said preionizing means produce said preionizing discharge in said preionizing electrodes faster than production of the main electric discharge in said main discharge means.

9. A discharge-pumped gas laser according to claim 6, wherein a sum of the preionizing energies stored in said distributing capacitors is smaller than the electric energy stored in said charging capacitor of said charging circuit.

10. A discharge-pumped gas laser according to claim 6, wherein said preionizing means further includes a plurality of preionizing charging coils in one-to-one correspondence to said distributing capacitors to store the preionizing energies in said distributing capacitors without supplying any electric currents to said preionizing electrodes.

11. A discharge-pumped gas laser according to claim 6, wherein a peaking capacitance of said peaking capacitor is equivalent to the capacitance of said charging capacitor of said charging circuit, and said preionizing means operates to produce the preionizing discharge in said preionizing electrodes faster than the production of the main electric discharge in said main discharge means.

12. A discharge-pumped gas laser according to claim 6, wherein a peaking capacitance of said peaking capacitor is equivalent to the capacitance of said charging capacitor of said charging circuit, and a sum of the preionizing energies stored in said distributing capacitors is smaller than the electric energy stored in said charging capacitor of said charging circuit.

13. A discharge-pumped gas laser according to claim 1, wherein a peaking capacitance of said peaking capacitor is equivalent to the capacitance of said charging capacitor of said charging circuit, and said preionizing means operates to produce the preionizing discharge in said preionizing electrodes faster than production of the main electric discharge in said main discharge means.

14. A discharge-pumped gas laser according to claim 1, wherein a peaking capacitance of said peaking capacitor is equivalent to the capacitance of said charging capacitor of said charging circuit, and a sum of preionizing energies stored in said distributing capacitors is smaller than the electric energy stored in said charging capacitor of said charging circuit.

* * * * *